(12) United States Patent
Kim (10) Patent No.: US 9,575,768 B1
(45) Date of Patent: Feb. 21, 2017

(54) LOADING BOOT CODE FROM MULTIPLE MEMORIES

(71) Applicant: Marvell International Ltd., Hamilton (BM)

(72) Inventor: Myungque Kim, Issaquah, WA (US)

(73) Assignee: Marvell International Ltd., Hamilton (BM)

( * ) Notice: Subject to any disclaimer, the term of this patent is extended or adjusted under 35 U.S.C. 154(b) by 170 days.

(21) Appl. No.: 14/147,087

(22) Filed: Jan. 3, 2014

Related U.S. Application Data (60) Provisional application No. 61/750,222, filed on Jan. 8, 2013.

(51) Int. Cl.
*G06F 15/177* (2006.01)
*G06F 9/44* (2006.01)

(52) U.S. Cl.
CPC .................. *G06F 9/4401* (2013.01)

(58) Field of Classification Search
CPC ...................................... G06F 9/445
See application file for complete search history.

(56) References Cited

U.S. PATENT DOCUMENTS

| | | |
|---|---|---|
| 5,155,833 A | 10/1992 | Cullison et al. |
| 5,390,165 A | 2/1995 | Tuch |
| 5,467,398 A | 11/1995 | Pierce et al. |
| 5,469,506 A | 11/1995 | Berson et al. |
| 5,479,514 A | 12/1995 | Klonowski |
| 5,481,733 A | 1/1996 | Douglis et al. |
| 5,617,118 A | 4/1997 | Thompson |
| 5,673,416 A | 9/1997 | Chee et al. |
| 5,696,989 A | 12/1997 | Miura et al. |
| 5,771,356 A | 6/1998 | Leger et al. |
| 5,828,835 A | 10/1998 | Isfeld et al. |
| 5,884,099 A | 3/1999 | Klingelhofer |
| 5,991,519 A | 11/1999 | Benhammou et al. |
| 6,006,018 A | 12/1999 | Burnett et al. |
| 6,014,722 A | 1/2000 | Rudin et al. |

(Continued)

FOREIGN PATENT DOCUMENTS

| | | |
|---|---|---|
| CN | 88102647 | 12/1988 |
| CN | 1140272 | 1/1997 |

(Continued)

OTHER PUBLICATIONS

"Advisory Action", U.S. Appl. No. 13/804,425, Dec. 26, 2014, 3 pages.

(Continued)

*Primary Examiner* — Kim Huynh
*Assistant Examiner* — Eric Chang (57) ABSTRACT

The present disclosure describes apparatuses and techniques for loading boot code from multiple memories. In some aspects a transfer operation transferring a portion of boot code from a memory of a first type is initiated prior to completion of another transfer operation transferring another portion of the boot code from another memory of the first type. This can be effective to enable concurrent transfers of boot code from multiple memories of the first type into a memory of a second type for execution. By so doing, a speed at which boot code is transferred into the memory of the second type is increased, which may result in decreased device boot times.

20 Claims, 7 Drawing Sheets

(56) References Cited

U.S. PATENT DOCUMENTS

| | | | |
|---|---|---|---|
| 6,058,188 A | 5/2000 | Chandersekaran et al. |
| 6,092,108 A | 7/2000 | DiPlacido et al. |
| 6,145,069 A | 11/2000 | Dye |
| 6,216,230 B1 | 4/2001 | Rallis et al. |
| 6,230,277 B1 | 5/2001 | Nakaoka et al. |
| 6,330,626 B1 | 12/2001 | Dennin et al. |
| 6,389,538 B1 | 5/2002 | Gruse et al. |
| 6,463,509 B1 | 10/2002 | Teoman et al. |
| 6,473,861 B1 | 10/2002 | Stokes |
| 6,564,318 B1 | 5/2003 | Gharda et al. |
| 6,601,167 B1 | 7/2003 | Gibson et al. |
| 6,678,790 B1 | 1/2004 | Kumar |
| 6,711,447 B1 | 3/2004 | Saeed |
| 6,756,988 B1 | 6/2004 | Wang et al. |
| 6,799,271 B2 | 9/2004 | Kugai |
| 6,823,472 B1 | 11/2004 | DeKoning et al. |
| 6,832,280 B2 | 12/2004 | Malik et al. |
| 6,901,298 B1 | 5/2005 | Govindaraj et al. |
| 7,010,808 B1 | 3/2006 | Leung et al. |
| 7,035,827 B2 | 4/2006 | Ezaki |
| 7,036,018 B2 | 4/2006 | Horvat et al. |
| 7,089,419 B2 | 8/2006 | Foster et al. |
| 7,103,788 B1 | 9/2006 | Souza et al. |
| 7,117,352 B1 | 10/2006 | Giles et al. |
| 7,126,913 B1 | 10/2006 | Patel et al. |
| 7,194,638 B1 | 3/2007 | Larky |
| 7,206,940 B2 | 4/2007 | Evans et al. |
| 7,210,038 B2 | 4/2007 | Walmsley |
| 7,266,842 B2 | 9/2007 | Foster et al. |
| 7,299,365 B2 | 11/2007 | Evans |
| 7,308,591 B2 | 12/2007 | Dubinsky |
| 7,333,464 B2 | 2/2008 | Yang et al. |
| 7,356,707 B2 | 4/2008 | Foster et al. |
| 7,370,349 B2 | 5/2008 | Holvey et al. |
| 7,373,506 B2 | 5/2008 | Asano et al. |
| 7,376,976 B2 | 5/2008 | Fierstein et al. |
| 7,496,952 B2 | 2/2009 | Edwards et al. |
| 7,511,636 B2 | 3/2009 | Takahashi |
| 7,516,325 B2 | 4/2009 | Willey |
| 7,522,726 B2 | 4/2009 | Ishiguro et al. |
| 7,533,253 B2 * | 5/2009 | Jo | G06F 9/4403 713/2 |
| 7,536,558 B2 | 5/2009 | Neble et al. |
| 7,549,056 B2 | 6/2009 | Carr |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,620,784 B2 | 11/2009 | Panabaker |
| 7,676,040 B2 | 3/2010 | Augenstein et al. |
| 7,725,738 B1 | 5/2010 | Langhammer et al. |
| 7,725,818 B1 | 5/2010 | Krishnan et al. |
| 7,743,260 B2 | 6/2010 | Fetik |
| 7,774,635 B2 | 8/2010 | Shiota |
| 7,788,670 B2 | 8/2010 | Bodas et al. |
| 7,818,389 B1 | 10/2010 | Chiang et al. |
| 7,835,725 B2 | 11/2010 | Suzuki et al. |
| 7,865,733 B2 | 1/2011 | Goto et al. |
| 7,873,841 B2 | 1/2011 | Mullis, II et al. |
| 7,898,857 B2 | 3/2011 | Kirsch et al. |
| 7,900,060 B2 | 3/2011 | Hodzic |
| 7,991,943 B2 | 8/2011 | Berenbaum et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,094,822 B2 | 1/2012 | Suzuki |
| 8,095,816 B1 | 1/2012 | Chan |
| 8,117,478 B2 | 2/2012 | Liu et al. |
| 8,139,521 B2 | 3/2012 | Mukherjee et al. |
| 8,166,309 B2 | 4/2012 | Muralidharan et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,418,242 B2 | 4/2013 | Zhang et al. |
| 8,423,789 B1 | 4/2013 | Poo et al. |
| 8,443,187 B1 | 5/2013 | Orr |
| 8,443,211 B2 | 5/2013 | Zhao et al. |
| 8,483,718 B2 | 7/2013 | Hwang |
| 8,510,560 B1 | 8/2013 | Lambert et al. |
| 8,645,716 B1 | 2/2014 | Dujari et al. |
| 8,688,968 B2 | 4/2014 | Chu et al. |
| 8,694,782 B2 | 4/2014 | Lambert |
| 8,839,016 B2 | 9/2014 | Zhang et al. |
| 8,843,686 B1 | 9/2014 | Chan et al. |
| 9,009,778 B2 | 4/2015 | Pearce et al. |
| 9,141,394 B2 | 9/2015 | Sakarda |
| 9,220,012 B1 | 12/2015 | Inamdar |
| 9,253,175 B1 | 2/2016 | Orr |
| 9,398,455 B2 | 7/2016 | Lambert |
| 2002/0065834 A1 | 5/2002 | Wiggen et al. |
| 2002/0069354 A1 | 6/2002 | Fallon et al. |
| 2002/0087816 A1 | 7/2002 | Atkinson et al. |
| 2002/0103930 A1 | 8/2002 | Kamentsky et al. |
| 2003/0014368 A1 | 1/2003 | Leurig et al. |
| 2003/0188162 A1 | 10/2003 | Candelore et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0015621 A1 | 1/2004 | Tanaka |
| 2004/0030909 A1 | 2/2004 | Sako et al. |
| 2004/0054898 A1 | 3/2004 | Chao et al. |
| 2004/0103272 A1 | 5/2004 | Zimmer et al. |
| 2004/0125679 A1 | 7/2004 | Kwean |
| 2004/0158669 A1 | 8/2004 | Weng et al. |
| 2004/0158708 A1 | 8/2004 | Peyravian et al. |
| 2004/0184343 A1 | 9/2004 | Roohparvar et al. |
| 2004/0187001 A1 | 9/2004 | Bousis |
| 2004/0193875 A1 | 9/2004 | Aura |
| 2004/0250057 A1 * | 12/2004 | Fujita | G06F 9/4406 713/1 |
| 2004/0257462 A1 | 12/2004 | Goris et al. |
| 2004/0266386 A1 | 12/2004 | Kuo |
| 2005/0015602 A1 | 1/2005 | Rees |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0177674 A1 | 8/2005 | Ober et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0004946 A1 | 1/2006 | Shah et al. |
| 2006/0036897 A1 | 2/2006 | Lin et al. |
| 2006/0059372 A1 | 3/2006 | Fayar et al. |
| 2006/0072748 A1 | 4/2006 | Buer |
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0236198 A1 * | 10/2006 | Lintz, Jr. | G06F 11/0727 714/758 |
| 2006/0253704 A1 | 11/2006 | Kempf et al. |
| 2006/0253716 A1 | 11/2006 | Dhiman et al. |
| 2006/0259656 A1 | 11/2006 | Sullivan |
| 2006/0285686 A1 | 12/2006 | Van Den Heuvel et al. |
| 2007/0005824 A1 | 1/2007 | Howard |
| 2007/0011445 A1 | 1/2007 | Waltermann et al. |
| 2007/0022469 A1 | 1/2007 | Cooper et al. |
| 2007/0038866 A1 | 2/2007 | Bardsley et al. |
| 2007/0073915 A1 | 3/2007 | Go et al. |
| 2007/0097904 A1 | 5/2007 | Mukherjee et al. |
| 2007/0098178 A1 | 5/2007 | Raikar |

(56) References Cited

U.S. PATENT DOCUMENTS

| | | | |
|---|---|---|---|
| 2007/0136523 A1* | 6/2007 | Bonella | G06F 9/4401 711/113 |
| 2007/0136792 A1 | 6/2007 | Ting et al. | |
| 2007/0150756 A1 | 6/2007 | Kudelski | |
| 2007/0174602 A1* | 7/2007 | Kao | G06F 9/4403 713/2 |
| 2007/0180271 A1 | 8/2007 | Hatakeyama et al. | |
| 2007/0186105 A1 | 8/2007 | Bailey et al. | |
| 2007/0189249 A1 | 8/2007 | Gurevich et al. | |
| 2007/0220501 A1 | 9/2007 | Yanagawa et al. | |
| 2007/0234028 A1 | 10/2007 | Rothman et al. | |
| 2007/0242643 A1 | 10/2007 | Chandra et al. | |
| 2007/0260905 A1 | 11/2007 | Marsden et al. | |
| 2007/0277051 A1 | 11/2007 | Reece et al. | |
| 2007/0297606 A1 | 12/2007 | Tkacik et al. | |
| 2008/0005549 A1 | 1/2008 | Ke | |
| 2008/0016313 A1 | 1/2008 | Murotake et al. | |
| 2008/0028243 A1 | 1/2008 | Morisawa | |
| 2008/0034411 A1 | 2/2008 | Aoyama | |
| 2008/0043508 A1 | 2/2008 | Chao et al. | |
| 2008/0046732 A1 | 2/2008 | Fu et al. | |
| 2008/0066075 A1 | 3/2008 | Nutter et al. | |
| 2008/0072311 A1 | 3/2008 | Mullick et al. | |
| 2008/0082837 A1 | 4/2008 | Mattsson | |
| 2008/0084547 A1 | 4/2008 | Tokuda | |
| 2008/0091944 A1 | 4/2008 | von Mueller et al. | |
| 2008/0104422 A1 | 5/2008 | Mullis et al. | |
| 2008/0108322 A1 | 5/2008 | Upp | |
| 2008/0120717 A1 | 5/2008 | Shakkarwar | |
| 2008/0165952 A1 | 7/2008 | Smith et al. | |
| 2008/0295157 A1 | 11/2008 | Wong et al. | |
| 2008/0298289 A1 | 12/2008 | Jeyaseelan | |
| 2008/0313462 A1 | 12/2008 | Zhao et al. | |
| 2009/0006658 A1 | 1/2009 | Gough | |
| 2009/0024846 A1 | 1/2009 | Ganesan et al. | |
| 2009/0049222 A1 | 2/2009 | Lee et al. | |
| 2009/0059841 A1 | 3/2009 | Laroia et al. | |
| 2009/0077618 A1 | 3/2009 | Pearce et al. | |
| 2009/0080389 A1 | 3/2009 | Messerges et al. | |
| 2009/0131061 A1 | 5/2009 | Palanki et al. | |
| 2009/0199031 A1 | 8/2009 | Zhang | |
| 2009/0217043 A1 | 8/2009 | Metke et al. | |
| 2009/0222675 A1 | 9/2009 | Lange et al. | |
| 2009/0254771 A1 | 10/2009 | So et al. | |
| 2009/0310489 A1 | 12/2009 | Bennett | |
| 2009/0323972 A1 | 12/2009 | Kohno et al. | |
| 2009/0327608 A1 | 12/2009 | Eschmann et al. | |
| 2010/0023747 A1 | 1/2010 | Asnaashari et al. | |
| 2010/0039864 A1 | 2/2010 | Sarin et al. | |
| 2010/0058045 A1 | 3/2010 | Borras et al. | |
| 2010/0070751 A1 | 3/2010 | Chu | |
| 2010/0122017 A1* | 5/2010 | Toyama | G06F 12/0246 711/103 |
| 2010/0146157 A1 | 6/2010 | Choi et al. | |
| 2010/0174934 A1 | 7/2010 | Zhao | |
| 2010/0217935 A1 | 8/2010 | Cho et al. | |
| 2011/0039592 A1 | 2/2011 | Haddad et al. | |
| 2011/0066837 A1* | 3/2011 | Lee | G06F 9/4401 713/2 |
| 2011/0211564 A1 | 9/2011 | Yoneyama et al. | |
| 2011/0231649 A1 | 9/2011 | Bollay et al. | |
| 2011/0231652 A1 | 9/2011 | Bollay et al. | |
| 2012/0284517 A1 | 11/2012 | Lambert | |
| 2012/0287337 A1 | 11/2012 | Kumar et al. | |
| 2013/0031346 A1 | 1/2013 | Sakarda | |
| 2013/0046966 A1 | 2/2013 | Chu | |
| 2013/0124844 A1 | 5/2013 | Baratam | |
| 2013/0246792 A1 | 9/2013 | Lambert | |
| 2013/0346777 A1 | 12/2013 | Zhang | |
| 2014/0122810 A1 | 5/2014 | Bhoria et al. | |
| 2014/0189340 A1 | 7/2014 | Hadley | |
| 2014/0258724 A1 | 9/2014 | Lambert et al. | |
| 2015/0039876 A1 | 2/2015 | Baratam et al. | |
| 2015/0071438 A1 | 3/2015 | Lambert | |

FOREIGN PATENT DOCUMENTS

| | | |
|---|---|---|
| CN | 101097522 | 1/2008 |
| CN | 102272734 | 9/2014 |
| EP | 1847911 | 10/2007 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 2006285738 | 10/2006 |
| JP | 5565778 | 6/2014 |
| WO | WO-2013019423 | 2/2013 |
| WO | WO-2013074797 | 5/2013 |

OTHER PUBLICATIONS

"Board Opinion", CN Application No. 200980136849.9, Aug. 28, 2015, 18 Pages.

"Corrected Notice of Allowance", U.S. Appl. No. 13/676,701, May 18, 2016, 2 pages.

"Examiner's Answer to Appeal Brief", U.S. Appl. No. 13/958,101, Apr. 8, 2016, 9 pages.

"Extensions to Direct Link Setup (DLS) Comments", IEEE, P802.11z, Jul. 2009, pp. 1-3.

"Final Office Action", U.S. Appl. No. 12/098,254, May 18, 2011, 11 pages.

"Final Office Action", U.S. Appl. No. 12/101,668, May 10, 2012, 8 pages.

"Final Office Action", U.S. Appl. No. 12/125,670, May 24, 2011, 11 pages.

"Final Office Action", U.S. Appl. No. 12/125,693, Jun. 9, 2011, 9 pages.

"Final Office Action", U.S. Appl. No. 12/178,268, May 25, 2011, 13 pages.

"Final Office Action", U.S. Appl. No. 12/541,731, May 31, 2012, 11 pages.

"Final Office Action", U.S. Appl. No. 13/552,421, Mar. 16, 2015, 10 pages.

"Final Office Action", U.S. Appl. No. 13/804,425, Nov. 6, 2015, 9 pages.

"Final Office Action", U.S. Appl. No. 13/804,425, Nov. 21, 2014, 17 pages.

"Final Office Action", U.S. Appl. No. 13/863,079, Jan. 15, 2015, 7 pages.

"Final Office Action", U.S. Appl. No. 13/863,079, May 7, 2014, 7 pages.

"Final Office Action", U.S. Appl. No. 13/958,101, Dec. 19, 2014, 17 pages.

"Foreign Office Action", CN Application No. 200980136849.9, May 24, 2013, 20 Pages.

"Foreign Decision to Grant", JP Application No. 2011-544456, May 20, 2014, 2 pages.

"Foreign Notice of Allowance", CN Application No. 200980153758.6, Jul. 15, 2014, 4 Pages.

"Foreign Notice of Allowance", JP Application No. 2011-527899, Jan. 28, 2014, 1 Page.

"Foreign Office Action", CN Application No. 200980136849.9, Feb. 7, 2014, 15 Pages.

"Foreign Office Action", CN Application No. 200980136849.9, May 19, 2014, 11 Pages.

"Foreign Office Action", CN Application No. 200980153758.6, Apr. 27, 2013, 14 pages.

"Foreign Office Action", CN Application No. 200980153758.6, Dec. 30, 2013, 8 pages.

"Foreign Office Action", CN Application No. 201280033662.8, May 3, 2016, 26 pages.

"Foreign Office Action", European Patent Application No. 09803951.4, May 24, 2012, 3 pages.

(56) References Cited

OTHER PUBLICATIONS

"Foreign Office Action", European Patent Application No. 09803951.4, Dec. 13, 2012, 6 pages.
"Foreign Office Action", JP Application No. 2011-527899, Apr. 16, 2013, 5 pages.
"Foreign Office Action", JP Application No. 2011-527899, Nov. 6, 2012, 4 pages.
"Foreign Office Action", JP Application No. 2011-527899, Aug. 13, 2013, 2 pages.
"Foreign Office Action", JP Application No. 2011-544456, Jan. 29, 2013, 7 pages.
"Foreign Office Action", JP Application No. 2011-544456, Dec. 3, 2013, 2 pages.
"Foreign Office Action", JP Application No. 2011-544456, Jul. 9, 2013, 6 pages.
"Foreign Office Action", KR Application No. 10-2011-7008700, Jun. 16, 2015, 13 Pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Intent to Grant", EP Application No. 09803951.4, May 14, 2013, 13 Pages.
"International Search Report and Written Opinion", Application No. PCT/US2009/067767, Mar. 26, 2010, 12 pages.
"International Search Report and Written Opinion", Application No. PCT/US2009/056973, Nov. 4, 2009, 13 pages.
"International Search Report and Written Opinion", Application No. PCT/US2012/047426, Oct. 19, 2012, 7 pages.
"International Search Report and Written Opinion", Application No. PCT/IB2014/02221, Dec. 11, 2014, 8 Pages.
"International Search Report and Written Opinion", Application No. PCT/US2012/065290, May 2, 2013, 9 pages.
"International Search Report and Written Opinion", PCT Application No. PCT/US2013/031545, Mar. 14, 2015, 11 pages.
"International Search Report and Written Opinion", PCT Application PCT/US2012/036236, Jul. 6, 2012, 9 pages.
"International Search Report", Application No. PCT/US2008/078343, May 18, 2009, 5 pages.
"International Search Report", Application No. PCT/US2008/078343, Partial International Search, Mar. 5, 2009, 2 pages.
"Marketing Requirements Document for Interoperability Testing & Certification of Device Provisioning Protocol", Wi-Fi Alliance Device Provisioning Protocol Marketing Task Group; Version 1.2, 2012, 34 pages.
"Non-Final Office Action", U.S. Appl. No. 12/098,254, Jan. 14, 2011, 8 pages.
"Non-Final Office Action", U.S. Appl. No. 12/101,668, Apr. 5, 2011, 7 pages.
"Non-Final Office Action", U.S. Appl. No. 12/101,668, Aug. 9, 2012, 8 pages.
"Non-Final Office Action", U.S. Appl. No. 12/125,670, Dec. 13, 2011, 11 pages.
"Non-Final Office Action", U.S. Appl. No. 12/125,670, Dec. 7, 2010, 9 pages.
"Non-Final Office Action", U.S. Appl. No. 12/125,670, Jun. 4, 2012, 12 pages.
"Non-Final Office Action", U.S. Appl. No. 12/125,693, Oct. 3, 2011, 7 pages.
"Non-Final Office Action", U.S. Appl. No. 12/125,693, Dec. 20, 2010, 7 pages.
"Non-Final Office Action", U.S. Appl. No. 12/178,268, Dec. 21, 2011, 13 pages.
"Non-Final Office Action", U.S. Appl. No. 12/178,268, Dec. 22, 2010, 10 pages.
"Non-Final Office Action", U.S. Appl. No. 12/271,761, Oct. 3, 2011, 6 pages.
"Non-Final Office Action", U.S. Appl. No. 12/541,731, Oct. 21, 2011, 9 pages.
"Non-Final Office Action", U.S. Appl. No. 12/541,731, Sep. 4, 2012, 11 pages.
"Non-Final Office Action", U.S. Appl. No. 12/559,987, Nov. 9, 2011, 10 pages.
"Non-Final Office Action", U.S. Appl. No. 12/636,558, Jan. 10, 2012, 6 pages.
"Non-Final Office Action", U.S. Appl. No. 12/636,558, May 29, 2012, 8 pages.
"Non-Final Office Action", U.S. Appl. No. 13/252,416, Mar. 13, 2013, 16 pages.
"Non-Final Office Action", U.S. Appl. No. 13/333,551, Apr. 6, 2012, 5 pages.
"Non-Final Office Action", U.S. Appl. No. 13/462,972, May 22, 2013, 10 pages.
"Non-Final Office Action", U.S. Appl. No. 13/552,421, Sep. 30, 2014, 23 pages.
"Non-Final Office Action", U.S. Appl. No. 13/598,282, Oct. 16, 2013, 6 pages.
"Non-Final Office Action", U.S. Appl. No. 13/657,511, Mar. 28, 2013, 13 pages.
"Non-Final Office Action", U.S. Appl. No. 13/676,701, Jul. 31, 2015, 12 pages.
"Non-Final Office Action", U.S. Appl. No. 13/683,056, Nov. 8, 2013, 5 pages.
"Non-Final Office Action", U.S. Appl. No. 13/804,425, May 4, 2015, 15 pages.
"Non-Final Office Action", U.S. Appl. No. 13/804,425, Jul. 18, 2014, 14 pages.
"Non-Final Office Action", U.S. Appl. No. 13/863,079, Apr. 9, 2015, 7 pages.
"Non-Final Office Action", U.S. Appl. No. 13/863,079, Jun. 20, 2013, 10 pages.
"Non-Final Office Action", U.S. Appl. No. 13/863,079, Aug. 27, 2014, 6 pages.
"Non-Final Office Action", U.S. Appl. No. 13/863,079, Oct. 1, 2013, 9 pages.
"Non-Final Office Action", U.S. Appl. No. 13/874,201, Jun. 5, 2015, 10 pages.
"Non-Final Office Action", U.S. Appl. No. 13/958,101, Apr. 8, 2015, 16 pages.
"Non-Final Office Action", U.S. Appl. No. 13/958,101, Jun. 6, 2014, 14 pages.
"Non-Final Office Action", U.S. Appl. No. 14/205,196, Feb. 5, 2016, 14 pages.
"Non-Final Office Action", U.S. Appl. No. 14/315,019, May 20, 2016, 17 pages.
"Notice of Allowance", U.S. Appl. No. 12/098,254, Dec. 14, 2011, 4 pages.
"Notice of Allowance", U.S. Appl. No. 12/098,254, Sep. 28, 2011, 4 pages.
"Notice of Allowance", U.S. Appl. No. 12/101,668, Jan. 11, 2013, 6 pages.
"Notice of Allowance", U.S. Appl. No. 12/125,670, Dec. 11, 2012, 8 pages.
"Notice of Allowance", U.S. Appl. No. 12/178,268, Jul. 2, 2012, 4 pages.
"Notice of Allowance", U.S. Appl. No. 12/271,761, Jan. 3, 2012, 6 pages.
"Notice of Allowance", U.S. Appl. No. 12/541,731, Apr. 2, 2013, 8 pages.
"Notice of Allowance", U.S. Appl. No. 12/559,987, Jun. 15, 2012, 5 pages.
"Notice of Allowance", U.S. Appl. No. 12/636,558, Jan. 9, 2013, 4 pages.
"Notice of Allowance", U.S. Appl. No. 13/252,416, Sep. 27, 2013, 10 pages.
"Notice of Allowance", U.S. Appl. No. 13/333,551, May 30, 2012, 4 pages.
"Notice of Allowance", U.S. Appl. No. 13/552,421, May 12, 2015, 4 pages.
"Notice of Allowance", U.S. Appl. No. 13/552,421, Jun. 10, 2015, 5 pages.

(56) References Cited

OTHER PUBLICATIONS

"Notice of Allowance", U.S. Appl. No. 13/598,282, May 6, 2014, 4 pages.
"Notice of Allowance", U.S. Appl. No. 13/657,511, Nov. 4, 2013, 9 pages.
"Notice of Allowance", U.S. Appl. No. 13/676,701, Feb. 10, 2016, 5 pages.
"Notice of Allowance", U.S. Appl. No. 13/683,056, May 9, 2014, 4 pages.
"Notice of Allowance", U.S. Appl. No. 13/804,425, Mar. 21, 2016, 9 pages.
"Notice of Allowance", U.S. Appl. No. 13/874,201, Sep. 25, 2015, 6 pages.
"Part 11—Wireless LAN Medium Access Control (MAC) and Physical Layer (PHY) Specifications", Information Technology—Telecommunications & Information Exchange Between Systems . . . International Standard, ISO/IEC 8802-11, First Ed., 1999, pp. 1-531.
"Public Key Cryptography for the Financial Services Industry: Elliptic Curve Key Agreement and Key Transport Schemes", Working Draft; Version 2.0, Jul. 5, 1998, 125 pages.
"Restriction Requirement", U.S. Appl. No. 12/101,668, Sep. 22, 2011, 6 pages.
"Restriction Requirement", U.S. Appl. No. 13/676,701, Feb. 12, 2015, 7 pages.
"Specification Requirements Document (SRD) for Devise Provisioning Protocol", Wi-Fi Alliance Device Provisioning Protocol Marketing Task Group; Version 1.1, 2013, 13 pages.
"Supplemental Notice of Allowance", U.S. Appl. No. 12/101,668, Feb. 8, 2013, 4 Pages.
"Supplemental Notice of Allowance", U.S. Appl. No. 13/333,551, Oct. 23, 2012, 2 pages.
"Wi-Fi Peer-to-Peer (P2P) Technical Specification", WiFi Alliance; Version 1.5, 2014, 183 pages.
Anderson,"HDD Based Full Disc Encryption", In Proceedings of THIC Conference 2006, Mar. 2006, 12 pages.
Cooper,"Internet X.509 Public Key Infrastructure Certificate and Certificate Revocation List (SRL) Profile", Network Working Group; RFC 5280, May 2008, 152 pages.
Harkins,"Synthetic Initialization Vecor (SIV) Authenticated Encryption Using the Advanced Encryption Standard (AES)", Network Working Group; RFC 5297; Aruba Networks, Oct. 2008, 27 pages.
Krawczyk,"HMAC-based Extract-and-Expand Key Derivation Function (HKDF)", Internet Engineering Task Forct (IETF); RFC 5869, May 2010, 15 pages.
McGrew,"Fundamental Elliptic Curve Cryptography Algorithms", Internet Engineering Task Force (IETF); RFC 6090; Fundamental Elliptic Cryptography Algorithms, Feb. 2011, 35 pages.
Van"Crypto Based Host Identifiers", Internet Draft; draft-van-beijnum-multi6-cbhi-00.txt; ISSN: 0000-0004; XP15036389A, Jan. 1, 2004, 9 pages.
"Final Office Action", U.S. Appl. No. 14/205,196, Aug. 25, 2016, 16 pages.
"Final Office Action", U.S. Appl. No. 14/315,019, Sep. 15, 2016, 21 pages.

\* cited by examiner

Fig. 7

LOADING BOOT CODE FROM MULTIPLE MEMORIES

CROSS REFERENCE TO RELATED APPLICATIONS

This present disclosure claims priority to U.S. Provisional Patent Application Ser. No. 61/750,222 filed Jan. 8, 2013, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing and electronic devices often execute an operating system or applications to implement functionalities of the device. An operating system or applications of a device, however, are unable to execute until boot code is used to configure and boot the device for operation. When booting a device, the boot code is typically copied from a non-volatile memory to a volatile memory of the device for execution. Once the boot code is copied into the volatile memory, a processor executes the boot code in order to configure the components of the device for operation.

SUMMARY

The details of one or more implementations are set forth in the accompanying drawings and the description below. Other features and advantages will be apparent from the description and drawings. As such, this Summary should not be considered to describe essential features nor used to limit the scope of the claimed subject matter.

A method is described for initiating, via a direct memory access (DMA) controller, a first transfer operation transferring a first portion of boot code from a first memory of a first type into a memory of a second type. The method then initiates, via the DMA controller and prior to completion of the first transfer operation, a second transfer operation transferring a second portion of the boot code from a second memory of the first type into the memory of the second type. After completion of the first and second transfer operations, a processor is caused to execute the first and second portions of the boot code from the memory of the second type.

Another method is described for receiving, via a first data interface, a first portion of boot code from a first memory of a first type and receiving, via a second data interface, a second portion of boot code from a second memory of the first type. The first and second portions of boot code are then transmitted, via a system bus, to a memory of a second type for execution by a processor.

A System-on-Chip is described that includes a boot manager that is configured to load boot code from multiple non-volatile memory devices. The boot manager determines whether each respective non-volatile memory includes a portion of boot code. For each of the multiple non-volatile memories determined to include a portion of boot code, the boot manager configures, without waiting for a previously configured DMA operation to complete, a DMA operation to copy the respective portions of the boot code to a volatile memory. The boot manager then initiates execution of the boot code after completion of the DMA operations.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for loading boot code sequentially copy the boot code from individual non-volatile memories into a volatile memory for execution. For example, when a first block of boot code is detected in a non-volatile memory, the first block of boot code is transferred into the volatile memory before determining whether another non-volatile memory contains additional blocks of boot code. Thus, the boot process is delayed while the first and any other blocks of boot code are individually transferred into the volatile memory. Additionally, data-transfer speeds of non-volatile memories are often slower than those of other data buses of a device, resulting in under-utilization of other system resources during the boot process. Accordingly, sequentially loading boot code delays other boot operations and is inefficient with respect to utilization of other system resources, resulting in prolonged device boot-up times.

This disclosure describes apparatuses and techniques for loading boot code from multiple memories, which enable portions of boot code to be concurrently transferred from multiple non-volatile memories. The portions of boot code are transferred to a volatile memory via a system bus, which has a more bandwidth than respective interfaces of the multiple non-volatile memories from which the portions of boot code are received. By so doing, the portions of boot code can be transferred without waiting for individual transfers to complete and with higher utilization of other system resources. This can be effective reduce delays in the boot process, increase system resource efficiency, or reduce an overall boot time of the device.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
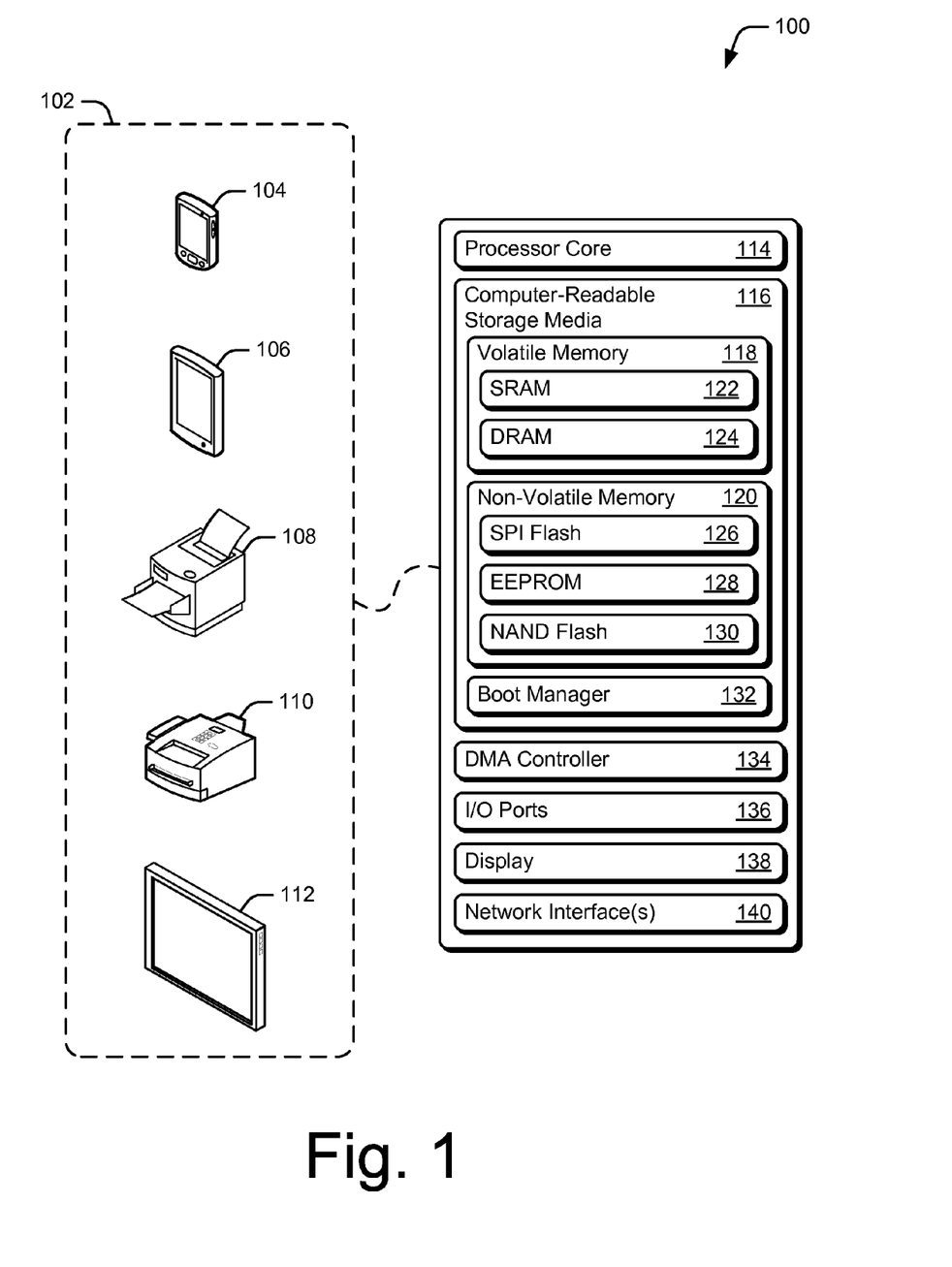
FIG. 1 illustrates an operating environment having computing devices in accordance with one or more aspects.

FIG. 1 illustrates an example of an operating environment 100 having computing devices 102, each of which are capable of communicating, accessing, presenting, or processing various data. Computing devices 102 include smartphone 104, tablet computer 106, multi-function printer 108, and fax machine 110, and internet-protocol enabled television 112 (IP TV 112). Although not shown, other configurations of computing devices 102 are also contemplated such as a desktop computer, server, mobile-internet device (MID), camera, netbook, ultra-book, gaming console, appliances, mobile hotspot, networked media player, and so on.

Generally, computing devices 102 have operational states ranging from an "off" state to an "on" state. These states may include a fully off state (mechanical off), suspend state, sleep state, hibernation state, idle state, active state, and the like. When transitioning from a lower operational state to a higher operational state (e.g., from an off state to an active state), computing device 102 is booted. Booting computing device 102 includes transferring and/or executing low-level code (e.g., boot code) to configure components of computing device 102 for operation.

Each computing device 102 includes processor core 114 (e.g. an application processor core) and computer-readable storage media 116 (CRM 116). Although shown as a single core, processor core 114 may be one of any suitable number and/or type of processing cores, which may be configured in any suitable manner (e.g., a heterogeneous multi-core application processor). CRM 116 includes volatile memory 118 and non-volatile memory 120, which may include any suitable type, combination, or number of memory devices. In this particular example, volatile memory 118 includes static random access memory 122 (SRAM 122) and synchronous dynamic random-access memory 124 (DRAM 124). Alternately or additionally, volatile memory 118 may include other suitable types of memory, such as random-access memory (RAM), asynchronous dynamic RAM, double-data-rate RAM (DDR), and the like.

Non-volatile memory 120 includes serial-peripheral interface (SPI) Flash 126, electronically-erasable programmable read-only-memory (EEPROM) 128, and NAND Flash 130. Other non-volatile memories contemplated include non-volatile RAM (NVRAM), read-only memory (ROM), embedded multimedia card (eMMC) devices, NOR Flash, single-level cell (SLC) Flash, multi-level cell (MLC) Flash, and the like. Each non-volatile memory communicates via a respective data interface, which can be configured as a serial, parallel, or multi-bit interface implementing any suitable communication protocol. Alternately or additionally, each non-volatile memory may communicate at a different respective data-transfer rate. For example, SPI Flash 126, EEPROM 128, NAND Flash 130 may communicate at 100 MB/s, 10 MB/s, and 50 MB/s, respectively.

Non-volatile memory 120 stores data of computing device 102 persistently when powered-down or suspended. Boot code of computing device 102 is stored in one or more non-volatile memory components, such as SPI Flash 126 and NAND Flash 130. Operating systems, applications, or user data (not shown) of computing device 102 may be stored by, or executed from, volatile memory 118, non-volatile memory 120, or any other suitable type of CRM 116. Alternately or additionally, operating systems and/or applications of computing device 102 may be embodied as firmware or other processor-executable instructions, binaries, or code. Operating systems and applications of device 102 are executable by processor core 114 to provide a user interface, various functionalities, and/or services of computing device 102.

CRM 116 also contains boot manager 132, which in this particular example, is embodied as processor-executable instructions that are executable by processor core 114 to implement various functionalities. Alternately or additionally, boot manager 132 may be implemented, in part or whole, via firmware or hardware (not shown) or any suitable combination thereof. In some cases, boot manager 132 is hard-coded into a one-time programmable (OTP) memory during fabrication (e.g., manufacturing) of the OTP memory or a chip on which the OTP memory resides. Boot manager 132 may enable concurrent transfers of portions of boot code from non-volatile memory 120 to volatile memory 118. The implementation and use of boot manager 132 varies and is described below.

Computing device 102 also includes direct memory access (DMA) controller 134, which is a memory controller that enables DMA operations between various memories of computing device 102, such as SRAM 122, SPI Flash 126, or NAND Flash 130. Computing device 102 may also include other non-DMA-capable memory controllers (not shown) associated with volatile memory 118 or non-volatile memory 120. DMA operations transfer data from a source memory to a destination memory without involving a higher-level controller or processor (e.g., processor core 114). These DMA operations may include single operation DMA algorithms or advanced DMA operations, such as scatter gather DMA algorithms. Non-volatile memory 120 is accessible via DMA controller 134, which enables DMA controller 134 to transfer boot code from non-volatile memory 120 using DMA operations.

Computing device 102 may also include I/O ports 136, display 138, or network interface(s) 140. I/O ports 136 allow computing device 102 to interact with other devices or users. I/O ports 136 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with I/O ports 136, such as human-input devices (HIDs), external computer-readable storage media, or other peripherals.

Display 138 may present a user interface or rendered graphics associated with an operating system or application of computing device 102. Display 138 may include a touch-input sensor (not shown), such as a touch screen or touch-sensitive overlay. Network interface(s) 140 provides connectivity to one or more networks and other devices connected therewith. Data communicated over network interfaces 140 may be packetized or framed depending on a communication protocol or standard by which computing device 102 is communicating. Network interfaces 140 may include wired interfaces, such as Ethernet or fiber optic interfaces for communication over a local network, intranet, or the Internet. Network interfaces 140 may also include wireless interfaces that facilitate communication over wireless networks, such as wireless LANs, cellular networks, or wireless personal-area-networks (WPANs).

Figure 2:
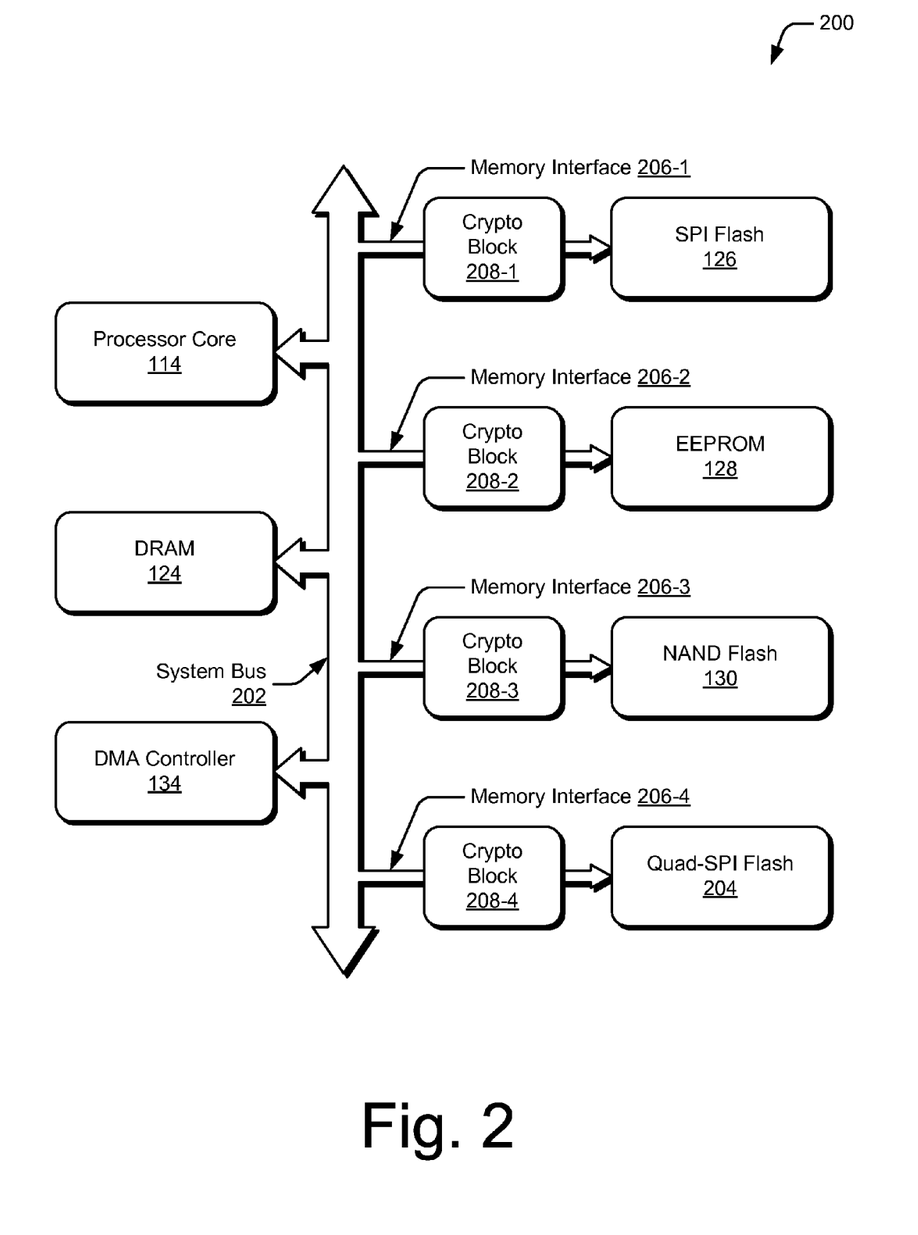
FIG. 2 illustrates an example system architecture of a computing device accordance with one or more aspects.

FIG. 2 illustrates an example system architecture of a computing device 102 generally at 200. Processor core 114, DRAM 124, and DMA controller 134 communicate via system bus 202, which may be configured as a high-speed bus, memory bus, system crossbar, or interconnect fabric. Communication between each of the components may be direct or indirect, such as through an intermediary component (e.g., memory controller). In some cases, processor core 114, DRAM 124, and DMA controller 134 are implemented as components of a System-on-Chip. Generally, when booting computing device 102 from an off, sleep, or hibernation state, boot code is copied from non-volatile memory devices into DRAM 124 via system bus 202.

In this example, the non-volatile memory devices include SPI Flash 126, EEPROM 128, NAND Flash 130, and quad-SPI Flash 204, which communicates over a multi-bit SPI interface. Each of these non-volatile memories may include a portion of boot code useful to boot computing device 102. In some cases, the boot code is structured as a boot image or composite boot image formed from multiple portions of boot code. The boot code may be portioned or partitioned at any suitable data granularity, such as by byte, page, block, or sector of data. Boot code of different portions may also be interleaved on a per-byte, per-page, or per-block basis. For example, even bytes of boot code can be stored in one portion boot code and odd bytes of the boot can be stored in another portion of the boot code.

In some aspects, an amount of boot code allocated to each non-volatile memory is based on a respective data-transfer speed of the device. For example, if a data-transfer rate of SPI Flash 126 (e.g., 100 MB/s) is twice that of NAND Flash 130 (e.g., 50 MB/s), then approximately twice an amount of the boot code (67%) can be allocated to SPI Flash 126 than an amount (33%) allocated to NAND Flash 130. This can be effective to increase efficiency of a boot process because concurrent transfers of the allocated boot code from these non-volatile devices may complete at approximately a same time.

DMA controller 134 accesses boot code stored in the non-volatile memories via memory interfaces 206 (206-1 through 206-4), each of which may be configured as any suitable type of data bus or data interface. In this example, memory interface 206-1 is configured as a SPI bus for communicating with SPI Flash 126 and memory interface 206-2 is configured as an inter-integrated circuit (I²C) bus for communicating with EEPROM 128. Other suitable data bus or data interface configurations may include secure digital input-output (SDIO), multimedia card (MMC), Open NAND Flash Interface (ONFI), NOR Flash interconnects, and the like.

Each memory interface 206 may also include a respective crypto block 208 (208-1 through 208-4) for performing encryption or hash operations when accessing data stored by the non-volatile memories. In some cases, boot code stored in the non-volatile memories is encrypted or signed to prevent altered or unauthorized boot code from being executed by computing device 102. In such cases, the boot code can be encrypted in accordance with the data encryption standard (DES) or advanced encryption standard (AES). Alternately or additionally, the boot code can be signed with a hash signature that enables a hash calculation to determine whether the boot code has been altered by unauthorized parties.

A signature in a first block of the code may also indicate that a particular non-volatile memory includes boot code or how many blocks of boot code are stored in the non-volatile memory. A first portion of boot code may also include other data useful to copy or transfer the boot code, such as initialization data, headers, address tables, descriptors, hash tables, configuration instructions, and the like. Alternately or additionally, this data may be stored in other locations of the non-volatile memory or a location external to the non-volatile memory. In some cases, boot manager 132 uses this information to configure transfer and link descriptors that cause DMA controller 134 to transfer boot code from the non-volatile memory.

Transfer descriptors typically include a destination address, a length indicator specifying an amount of data to transfer, and various attribute fields (e.g., descriptor type, validity, end, interrupt action). In this particular example, configuring a set of transfer descriptors enables DMA controller 134 to concurrently transfer boot code from multiple non-volatile memories into DRAM 124 for execution.

Techniques of Loading Boot Code from Multiple Memories

The following discussion describes techniques of loading boot code from multiple memories. These techniques can be implemented using the previously described environment or entities, such as boot manager 132 or DMA controller 134 of FIG. 1 embodied on a computing device 102. These techniques include methods illustrated in FIGS. 3, 5, and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2 and 4 by way of example. Such reference is not to be taken as limited to operating environment 100 but rather as illustrative of one of a variety of examples.

Figure 3:
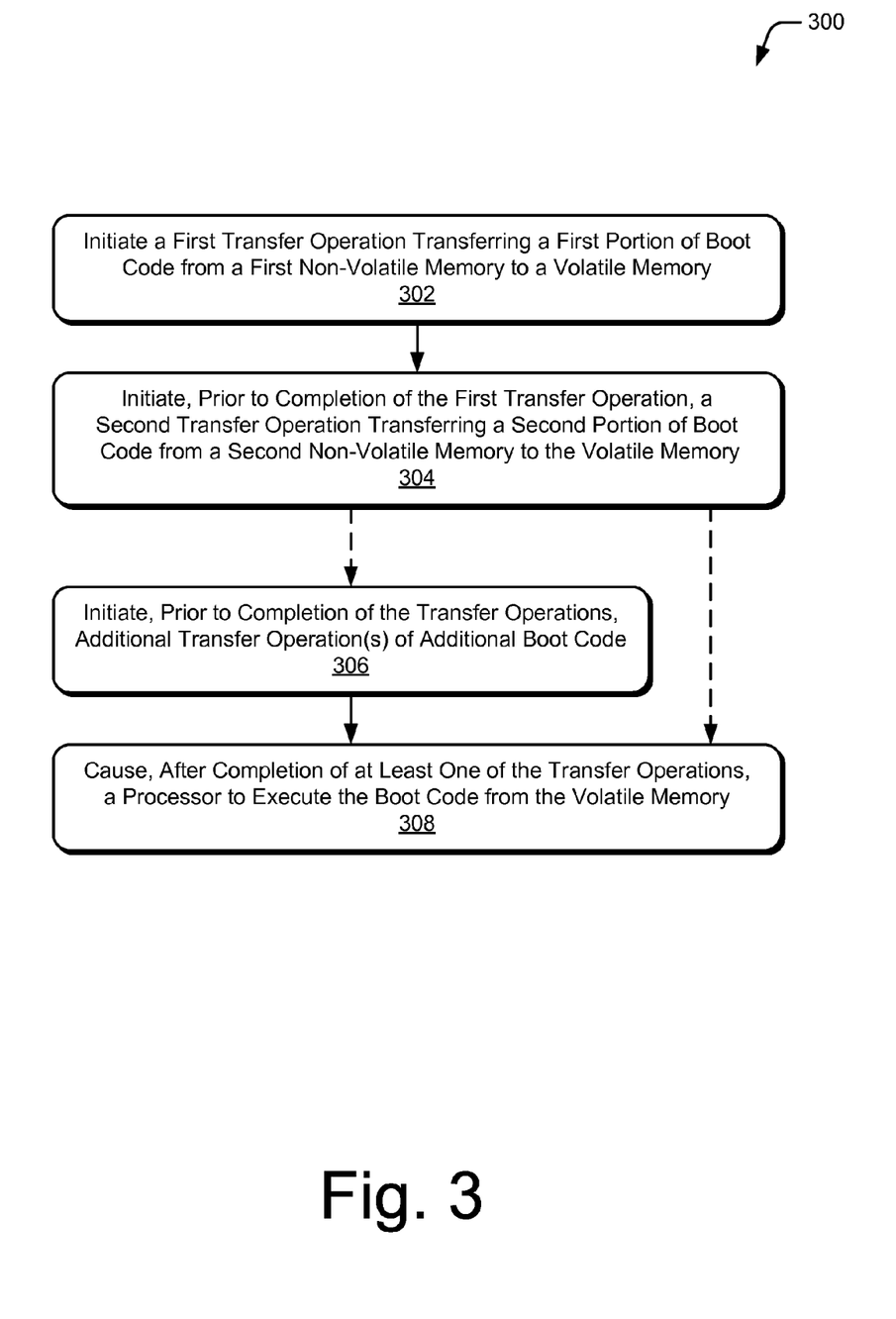
FIG. 3 illustrates a method for initiating multiple transfer operations from multiple respective memories.

FIG. 3 depicts a method 300 for initiating multiple transfer operations from multiple respective memories, including operations performed by boot manager 132 of FIG. 1.

At 302, a first transfer operation is initiated to transfer a first portion of boot code from a first non-volatile memory. The first transfer operation transfers the first portion of boot code to a volatile memory of a device. The first portion of boot code may include any suitable amount of data, such as a block or page of the boot code. In some cases, the first non-volatile memory includes an indicator indicating a presence of the first portion of boot code. In such cases, the first non-volatile memory can be selected for boot code loading based on this indicator.

The first transfer operation may be a DMA transfer implemented by a DMA controller configured to copy the first portion of boot code from the first non-volatile memory. In some cases, the DMA transfer is initiated by setting up the transfer, which may include configuring a DMA command or transfer descriptor that specifies the first non-volatile memory as a source of the first portion of boot code and the volatile memory as a destination.

Figure 4:
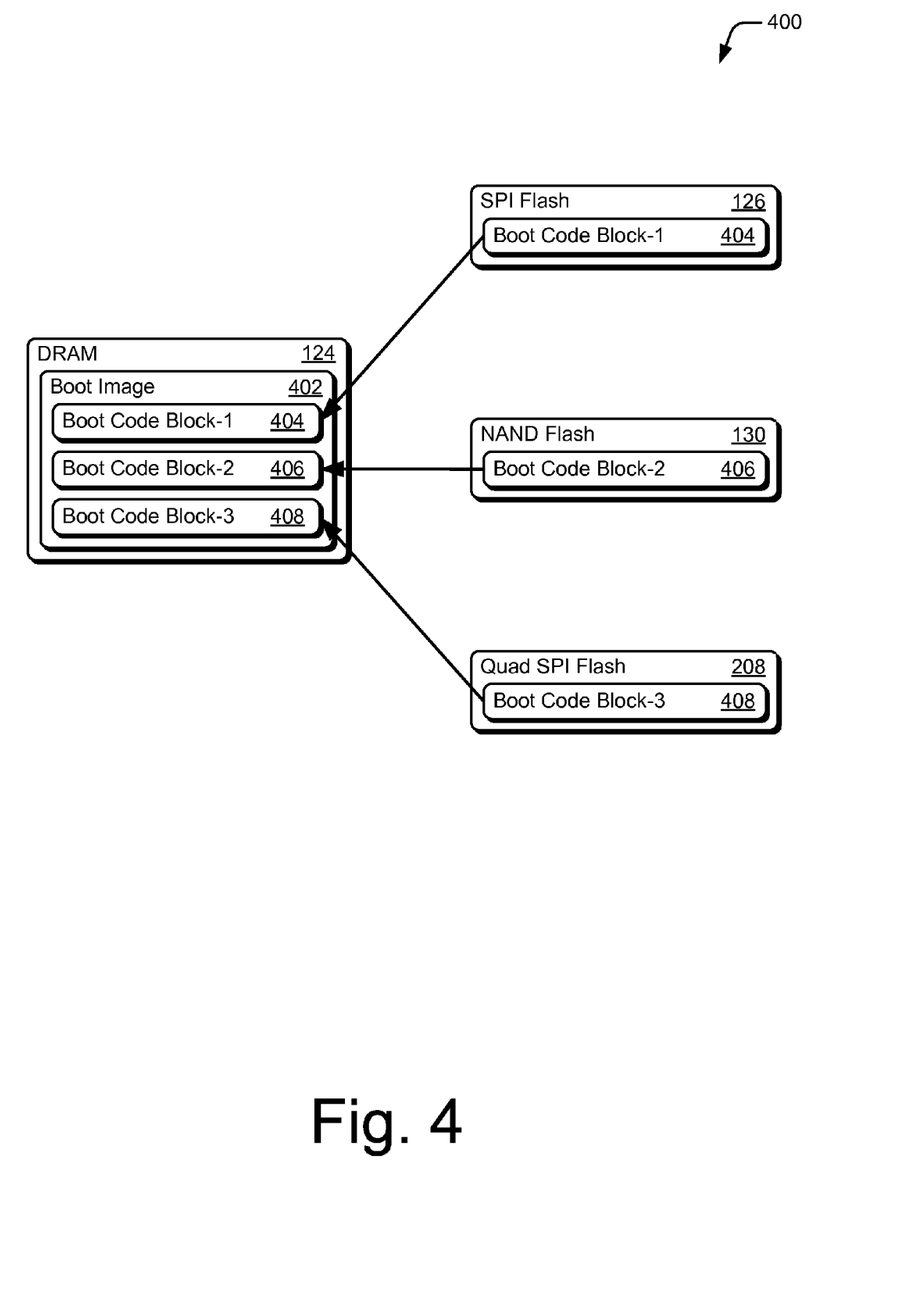
FIG. 4 illustrates an example allocation of a composite boot image in accordance with one or more aspects.

As an example, consider a user powering-on fax machine 110 of FIG. 1. Assume here that fax machine 110 is transitioning to an "on" state from an "off" state in which power was removed from volatile memory 118 and other various components of fax machine 110. As shown in FIG. 4, fax machine 110 includes boot image 402, which includes three portions of boot code: boot code block-1 404, boot code block-2 406, and boot code block-3, each of which is stored on a respective non-volatile memory. Here, boot manager 132 examines contents of SPI Flash 126 for an indication (e.g., boot code signature) as to whether SPI Flash 126 stores a first portion of boot image 402. In response to detecting a signature of boot code block-1 404, boot manager 132 configures a first DMA transfer command for DMA controller 134, which is effective to initiate a DMA transfer of boot code block-1 404 from SPI Flash 126.

At 304, a second transfer operation is initiated to transfer a second portion of boot code from a second non-volatile memory. This second transfer operation is initiated prior to completion of the first transfer operation. The second transfer operation transfers the second portion of boot code to the volatile memory of a device. The second portion of boot code may include any suitable amount of data, such as a block or page of the boot code. The second transfer operation may be another DMA transfer that is initiated by setting up the DMA transfer, which is then executed by the DMA controller. In some cases, this includes configuring a DMA command or transfer descriptor that specifies the second non-volatile memory as a source of the second portion of boot code and the volatile memory as a destination.

In the context of the present example, assume that boot manager 132 is configured to attempt initiation of boot code transfers from each non-volatile memory in a top-to-bottom order with reference to FIG. 2, starting with SPI Flash 126 and ending at quad-SPI Flash 204. Also assume that boot manager 132 does not detect an indication of boot code in EEPROM 128 and thus proceeds to NAND Flash 130. Here, boot manager 132 detects a signature of boot code block-2 406, which is stored by NAND Flash 130. Boot manger 132 then configures a second DMA transfer command for DMA controller 134, which is effective to initiate a DMA transfer of boot code block-2 406 from NAND Flash 130.

Optionally at 306, an additional transfer operation is initiated to transfer additional boot code from another non-volatile memory. This additional transfer operation is initiated prior to completion of the first and second transfer operations. Thus, two or more transfer operations may be initiated to concurrently transfer boot code from two or more respective non-volatile memories. The additional transfer operation may be another DMA transfer initiated by setting up the other DMA transfer as described above. Although illustrated as a single operation, operation 306 may be repeated to initiate any suitable number of transfer operations for transferring boot code from non-volatile memories to the volatile memory.

Continuing the ongoing example, after initiating a DMA transfer of boot code block-2 406, boot manager 132 proceeds to quad-SPI Flash 208. Here, boot manager 132 detects a signature of boot code block-3 408, which is stored by quad-SPI Flash 208. Boot manger 132 then configures a third DMA transfer command for DMA controller 134, which is effective to initiate a DMA transfer of boot code block-3 408 from quad-SPI Flash 208. In the context of this example, boot manager 132 has initiated three respective DMA transfers for transferring boot code block-1 404, boot code block-2 406, and boot code block-3 to DRAM 124.

As described above, boot code can be allocated to different non-volatile memories based on a respective data-transfer rate of each different device. Assume here that boot image 402 includes 8 MB of boot code and data-transfer rates of SPI Flash 126, NAND Flash 130, and Quad SPI Flash 208 are 100 MB/s, 100 MB/s, and 200 MB/s, respectively. Accordingly, to maximize transfer efficiencies, a system designer can allocate 4 MB of boot image 402 to boot code block-1 404, 2 MB of boot image 402 to boot code block-2 406, and 2 MB of boot image 402 to boot code block-3 408. By so doing, the three respective DMA transfers of boot code block-1 404, boot code block-2 406, and boot code block-3 may complete at approximately a same time.

At 308, a processor of the device is caused to execute the boot code after at least one of the transfer operations complete. For example, the processor may begin execution of the boot code once any of the transfer operations copy a portion of the boot code into the volatile memory. In some cases, the processor is caused to execute the boot code after two or more of the transfer operations complete. This can be effective to advance a boot process of the device to operations that are dependent on execution of the boot code. In some cases, control of the boot process is transferred to a boot loader or other entity implemented by executing the boot code. Alternately or additionally, other sources can be queried for additional boot code, such as a USB or Ethernet connection.

Concluding the present example, boot manager 132 monitors the three respective DMA transfers of boot code block-1 404, boot code block-2 406, and boot code block-3 into DRAM 124 of fax machine 110. When boot manager 132 determines that boot image 402 is completely transferred, boot manager 132 causes processor core 114 to execute boot image 402 from DRAM 124 to complete boot operations of fax machine 110. Because boot code block-1 404, boot code block-2 406, and boot code block-3 are concurrently loaded into DRAM 124 via respective DMA transfers, fax machine 110 is capable of booting up faster than if implementing a sequential boot code loading process.

Figure 5:
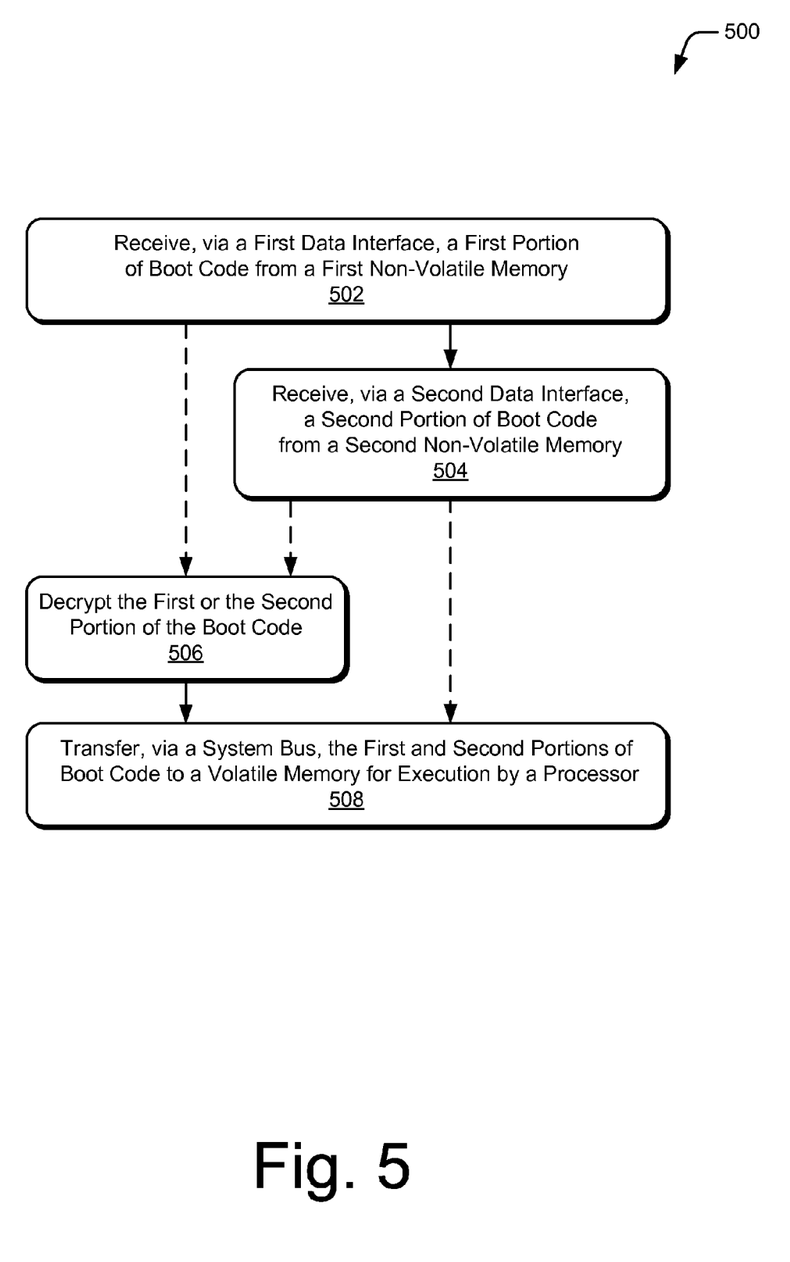
FIG. 5 illustrates a method for transferring multiple portions of boot code to a volatile memory via a system bus.

FIG. 5 depicts a method 500 for transferring multiple portions of boot code to a volatile memory via a system bus, including operations performed by DMA controller 134 of FIG. 1.

At 502, a first portion of boot code is received via a first data interface. The first portion of boot code is received from a first non-volatile memory. The first portion of boot code may be received at a DMA controller executing a DMA transfer of the first portion of boot code. In some cases, the first non-volatile memory is external to the DMA controller, which features multiple data interfaces to external non-volatile memories. In such cases, the first data interface may be configured to communicate with any suitable type of non-volatile memory, such as SPI Flash, NAND Flash, EEPROM, and the like. From operation 502, method 500 may proceed to operation 504 or to operation 506, at which decryption of the first portion of boot code may be performed.

At 504, a second portion of boot code is received via a second data interface. The second portion of boot code is received from a second non-volatile memory. At least some of the second portion of boot code is received while the first portion of boot code is being received from the first non-volatile memory. The second portion of boot code may also be received at the DMA controller executing a DMA transfer of the second portion of boot code. In some cases, the second non-volatile memory is external to the DMA controller that features multiple data interfaces to external non-volatile memories. In such cases, the second data interface may be configured to communicate with any suitable type of non-volatile memory, such as SPI Flash, NAND Flash, EEPROM, and the like. Alternately or additionally, the first and second data interfaces may be configured differently from each other and implement different bit-widths, clock speeds, transfer protocols, topologies, or communication protocols.

Optionally at 506, the first portion of boot code or the second portion of boot code is decrypted. In some cases, the first portion of boot code is decrypted independently from the second portion of boot code. In such cases, the decryption of the first portion of boot code may be performed while the second portion of boot code is received from the second data interface or decrypted via another decryption engine. The encrypted boot code can be decrypted using a cryptographic module associated with the DMA controller or data interface thereof. Alternately or additionally, a signature hash can be generated to verify authenticity of the boot code before permitting subsequent transfer of the boot code. By decrypting and verifying the boot code, execution of unauthorized or altered boot code can be prevented, which can increase device security or prevent access to protected resources of the device.

At 508, the first and second portions of boot code are transferred to a volatile memory via a system bus. The first and second portions of boot code are then executed in the volatile memory by a processor to boot the device. The system bus has a higher data-transfer rate than respective data-transfer rates of the first and second non-volatile memories. In some cases, the system bus can accommodate multiple concurrent transfers of respective portions of boot codes. In such cases, transferring the multiple respective portions of the boot code concurrently, rather than sequentially, can decrease an amount of time consumed while the boot code loads. This can be effective to reduce an amount of time consumed by a boot code loading process, resulting in faster device boot up.

Figure 6:
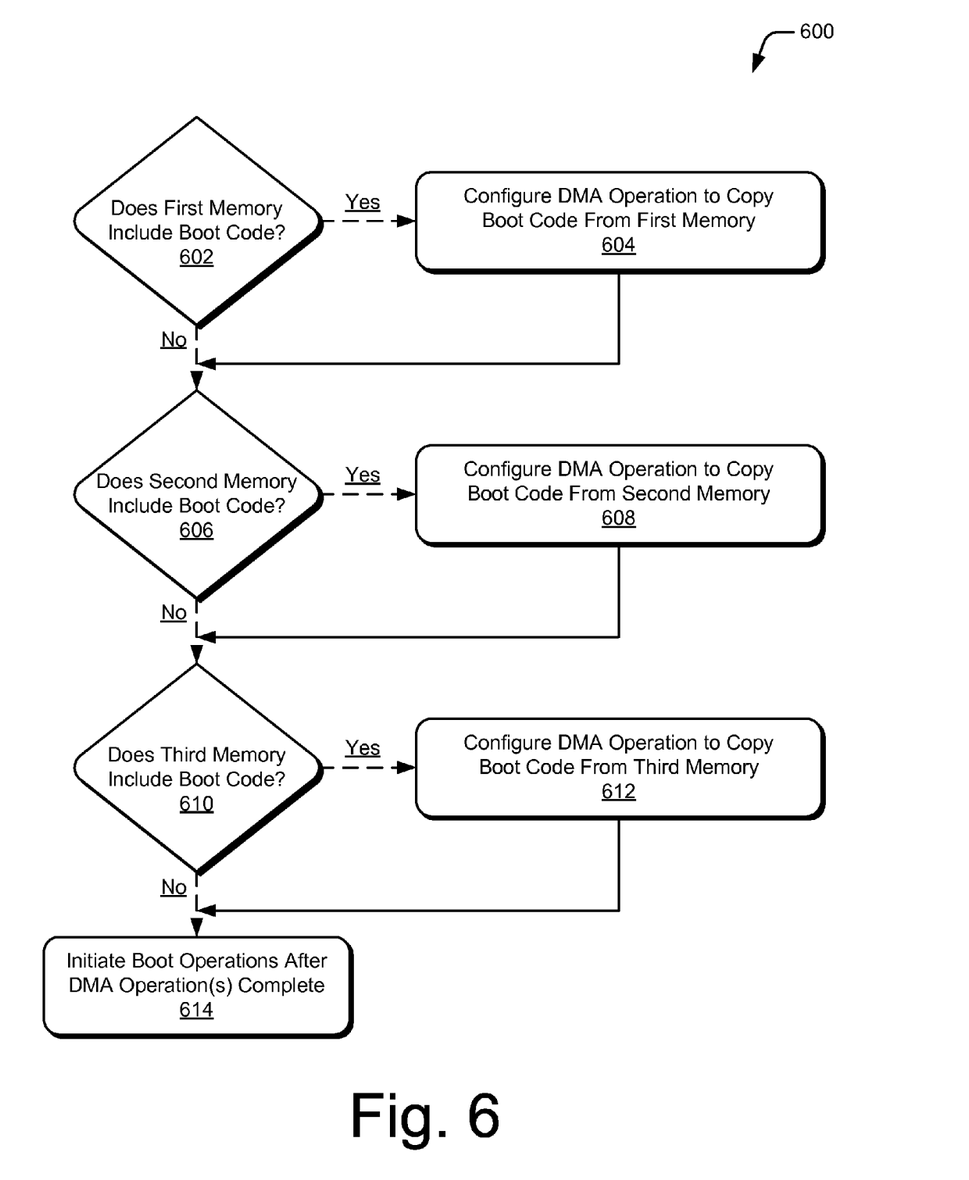
FIG. 6 illustrates a method for configuring multiple DMA operations for transferring boot code.

FIG. 6 depicts a method 600 for configuring multiple DMA operations for transferring boot code, including operations performed by boot manager 132 of FIG. 1.

At 602, a determination is made as to whether a first memory of a device includes boot code. The first memory may be a non-volatile memory device storing a portion of the boot code. The determination is based on an indicator in data of the first memory that indicates a presence of the boot code, such as a signature or hash in a first block of the data. From operation 602, method 600 proceeds to operation 604 if the first memory includes a portion of boot code or directly to operation 606 if the first memory does not include a portion of boot code.

At 604, a DMA operation is configured to copy the boot code from the first memory to another memory of the device for execution. Configuring the DMA operation may include setting up a DMA command or descriptor that, when executed by a DMA controller, copies the boot code from the first memory. In some cases, the DMA operation is a first DMA operation transferring a first portion of boot code from the first memory. The other memory is a volatile memory from which the boot code is executed to boot the device. Once the DMA operation is configured, method 600 proceeds from operation 604 to operation 606.

At 606, a determination is made as to whether a second memory of the device includes boot code. The second memory may be a non-volatile memory device storing a portion of the boot code. The determination is based on an indicator in data of the second memory that indicates a presence of the boot code, such as a signature or hash in a first block of the data. From operation 606, method 600 proceeds to operation 608 if the second memory includes a portion of boot code or directly to operation 610 if the second memory does not include a portion of boot code.

At 608, a DMA operation is configured to copy the boot code from the second memory to the other memory of the device for execution. Configuring the DMA operation may include setting up a DMA command or descriptor that, when executed by a DMA controller, copies the boot code from the first memory. In some cases, this DMA operation is a second DMA operation transferring a second portion of boot code from the second memory. In such cases, the first and second DMA operations are performed concurrently to increase an efficiency of a boot code loading process. Once the DMA operation is configured, method 600 proceeds from operation 608 to operation 610.

At 610, a determination is made as to whether a third memory of the device includes boot code. The third memory may be a non-volatile memory device storing a portion of the boot code. The determination is based on an indicator in data of the third memory that indicates a presence of the boot code, such as a signature or hash in a first block of the data. From operation 610, method 600 proceeds to operation 612 if the third memory includes a portion of boot code or directly to operation 614 if the third memory does not include a portion of boot code.

At 612, a DMA operation is configured to copy the boot code from the third memory to the other memory of the device for execution. Configuring the DMA operation may include setting up a DMA command or descriptor that, when executed by a DMA controller, copies the boot code from the first memory. In some cases, this DMA operation is a third DMA operation transferring a third portion of boot code from the third memory. In such cases, the first, second, and third DMA operations are performed concurrently to increase an efficiency of a boot code loading process. Once the DMA operation is configured, method 600 proceeds from operation 612 to operation 614.

At 614, boot operations of the device are initiated after at least one of the DMA operations complete. In some cases, the boot operations are initiated after multiple DMA operations complete, such as when the boot code of multiple non-volatile memories is interleaved. These boot operations may include assembly or integration of two or more portions of boot code, which are then executed from the other memory. In some cases, control of a boot process is transferred to an entity implemented by execution of the boot code, such as a boot loader. By using multiple DMA operations to transfer the boot code into the other memory, an amount of time consumed by boot operations of the device is reduced. This can be effective to significantly reduce a boot up time of a device, which may improve an overall user experience.

System-on-Chip

Figure 7:
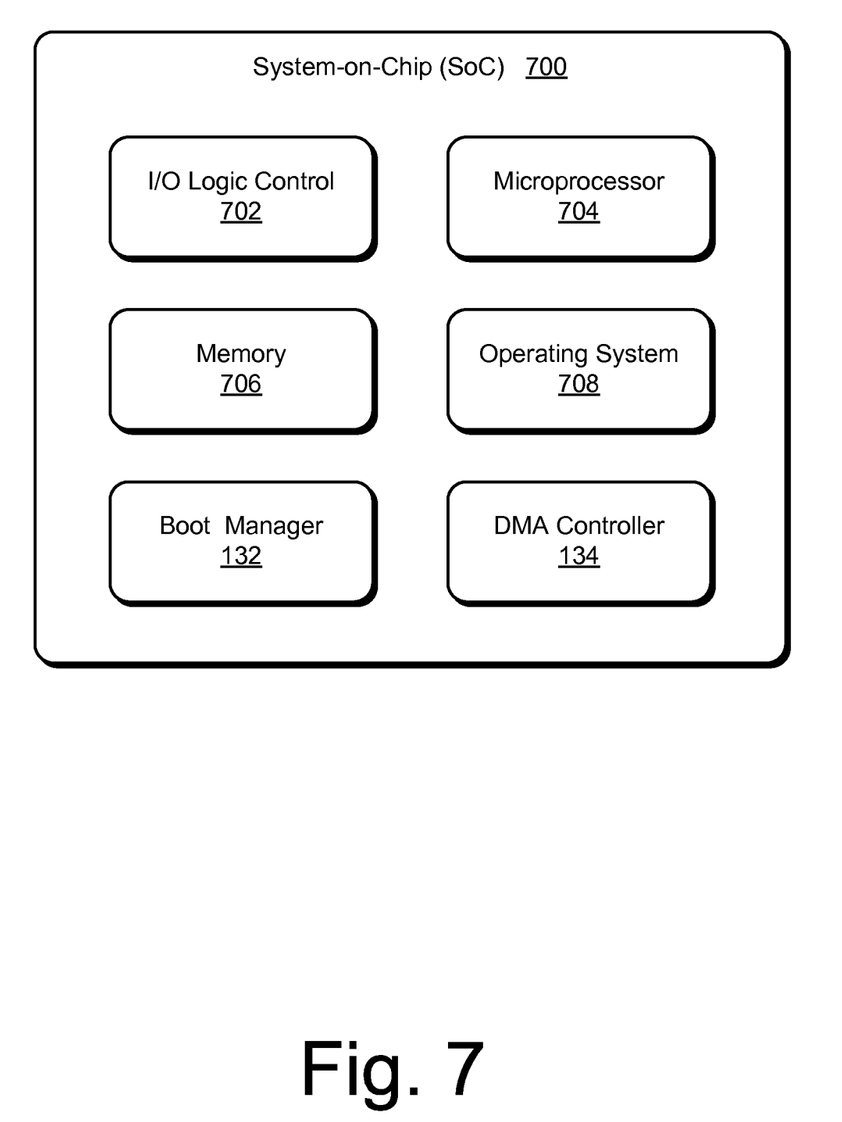
FIG. 7 illustrates a System-on-Chip (SoC) environment for implementing aspects of the techniques described herein.

FIG. 7 illustrates a System-on-Chip (SoC) 700, which can implement various aspects of loading boot code from multiple memories. A SoC can be implemented in any suitable device, such as a video game console, IP-enabled television, smart-phone, desktop computer, laptop computer, access point, wireless router, cellular broadband router, tablet computer, server, network-enabled printer, set-top box, printer, scanner, camera, picture frame, home appliance, thermostat, home automation device, and/or any other type of electronic device.

SoC 700 can be integrated with electronic circuitry, a microprocessor, memory, input-output (I/O) logic control, communication interfaces, other hardware, firmware, and/or software needed to provide functionalities of a device, such as any of the above-listed devices. SoC 700 can also include an integrated data bus (not shown) that couples the various components of the SoC for data communication between the components. A memory storage device that includes SoC 700 can also be implemented with many combinations of differing components. In some cases, these differing components may be configured to implement concepts described herein over various internal or external data interfaces.

In this example, SoC 700 includes various components such as an input-output (I/O) logic control 702 (e.g., to include electronic circuitry) and microprocessor 704. SoC 700 also includes memory 706, which can be any type and/or combination of RAM, SRAM, DRAM, Flash, low-latency nonvolatile memory, ROM, one-time programmable (OTP) memory, and/or other suitable electronic data storage. Alternately or additionally, SoC 700 may comprise data interfaces (not shown) for accessing additional or external off-chip memory, such as external SRAM, DRAM, or Flash memory. Although not shown, the external memory (or memory 706) may include multiple non-volatile memory devices storing multiple respective portions of boot code, as described with reference to FIGS. 2 and 5. SoC 700 can also include various firmware and/or software, such as operating system(s) 708, which can be computer-executable instructions maintained by memory 706 and executed by microprocessor 704. SoC 700 may also include other various communication interfaces and components embodied as hardware, firmware, software, or any suitable combination thereof.

SoC 700 also includes boot manager 132 and DMA controller 134 (either of which may embodied as disparate or combined components). Examples of these various components, functions, and/or entities, and their corresponding functionality, are described with reference to the respective components of the environment 100 and various configurations as illustrated by FIGS. 2 and 4. Boot manager 132, either independently or in combination with other entities (e.g., DMA controller 134), can be implemented as computer-executable instructions maintained by memory 706 and executed by microprocessor 704 to implement various embodiments and/or features described herein. Boot manager 132 may also be provided integral with other entities of the SoC, such as integrated a memory controller associated with memory 706 or another suitable software, firmware, or hardware component within SoC 700. Alternatively or additionally, boot manager 132 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   initiating, via a direct memory access (DMA) controller, a first transfer operation transferring a first portion of boot code from a first non-volatile memory of a device into a volatile memory of the device, the first portion of boot code including a first signature that indicates a presence of the first portion of boot code in the first non-volatile memory;
   initiating, via the DMA controller and prior to completion of the first transfer operation, a second transfer operation that concurrently transfers a second portion of the boot code from a second non-volatile memory of the device into the volatile memory of the device, the second portion of boot code including a second signature that indicates a presence of the second portion of boot code in the second non-volatile memory; and
   causing, after completion of at least the first transfer operation of the first portion of boot code, a processor of the device to execute the first and second portions of the boot code from the volatile memory of the device effective to initiate boot operations of the device.

2. The method of claim 1, wherein initiating the first and second transfer operations comprises configuring the DMA controller to transfer the first portion of the boot code from the first non-volatile memory and transfer the second portion of the boot code from the second non-volatile memory, respectively.

3. The method of claim 1 further comprising selecting, from two or more non-volatile memories, the first and second non-volatile memories from which to transfer the boot code into the volatile memory.

4. The method of claim 3, wherein selecting the first and second non-volatile memories from the two or more non-volatile memories comprises determining, based on the first and second signatures, that the first and second non-volatile memories include the first and second portions of boot code.

5. The method of claim 1, wherein a data-transfer speed of the first transfer operation is different from a data-transfer speed of the second transfer operation.

6. The method of claim 1, wherein the first portion of boot code and the second portion of boot code are respective portions of a composite boot image that, responsive to execution, implements the boot operations of the device.

7. The method of claim 1, wherein the first non-volatile memory or the second non-volatile memory comprises one of a serial peripheral interface (SPI) Flash memory, electronically-erasable programmable read-only memory (EEPROM), NAND Flash, embedded Flash, or embedded multimedia card (eMMC) device.

8. One or more hardware-based computer-readable memory devices storing processor-executable instructions that, responsive to execution by a processor of a device, implement a boot manager to:
   initiate, via a direct memory access (DMA) controller, a first transfer operation transferring a first portion of boot code from a first non-volatile memory of the device into a volatile memory of the device, the first portion of boot code including a first signature that indicates a presence of the first portion of boot code in the first non-volatile memory;
   initiate, via the DMA controller and prior to completion of the first transfer operation, a second transfer operation that concurrently transfers a second portion of the boot code from a second non-volatile memory of the device into the volatile memory of the device, the second portion of the boot code including a second signature that indicates a presence of the second portion of the boot code in the second non-volatile memory; and
   execute, via the processor and after completion of at least the first transfer operation of the first portion of boot code, the first and second portions of the boot code from the volatile memory of the device.

9. The one or more hardware-based computer-readable memory devices of claim 8, wherein the boot manager is further implemented to initiate the first transfer operation or the second transfer operation in response to respectively determining, based on the first signature or the second signature, that the first non-volatile memory includes the first portion of the boot code or the second non-volatile memory includes the second portion of the boot code.

10. The one or more hardware-based computer-readable memory devices of claim 8, wherein a data-transfer speed of the first non-volatile memory is different from a data-transfer speed of the second non-volatile memory.

11. The one or more hardware-based computer-readable memory devices of claim 10, wherein a size of the first portion of boot code is different from a size of the second portion of boot code, and a larger of the two portions of boot code is stored in the non-volatile memory having a higher of the two data-transfer speeds.

12. The one or more hardware-based computer-readable memory devices of claim 8, wherein the first and second portions of the boot code are interleaved portions of a composite boot image formed by the boot code, the first and second portions of boot code interleaved on a per-byte, per-page, or per-block basis.

13. The one or more hardware-based computer-readable memory devices of claim 8, wherein the first non-volatile memory or the second non-volatile memory comprise one of a serial peripheral interface (SPI) Flash memory, electronically-erasable programmable read-only memory (EEPROM), NAND Flash, embedded Flash, or embedded multimedia card (eMMC) device.

14. A System-on-Chip comprising:
 a processor configured to execute code to boot and implement functionalities of a device;
 volatile memory from which boot code is executable by the processor;
 a memory controller configured to enable concurrent access of multiple non-volatile memories; and
 a boot manager configured to:
  determine, based on signatures within the boot code, which of the multiple non-volatile memories include a respective portion of boot code;
  initiate, via the memory controller, a direct memory access (DMA) transfer operation transferring one of the respective portions of boot code from one of the multiple non-volatile memories into the volatile memory;
  initiate, via the memory controller and prior to completion of the transfer operation, at least one other DMA transfer operation that simultaneously transfers another respective portion of the boot code from another of the multiple non-volatile memories into the volatile memory; and
  causing, responsive to completion of at least one of the DMA transfer operations, the processor to initiate execution of the respective portions of the boot code from the volatile memory.

15. The System-on-Chip of claim 14, wherein the multiple non-volatile memories are external non-volatile memories associated with the System-on-Chip via multiple respective memory interfaces.

16. The System-on-Chip of claim 15, wherein a data-transfer speed of the DMA transfer operation is different from a data-transfer speed of the other DMA transfer operation.

17. The System-on-Chip of claim 15, wherein the memory controller includes or is implemented as a DMA controller to implement the DMA transfer operation and the other DMA transfer operation.

18. The System-on-Chip of claim 14, wherein the boot manager is further configured to initiate, prior to completion of the transfer operation, at least two other DMA transfer operations that simultaneously transfer two other portions of the boot code from respective ones of the multiple non-volatile memories, the respective portion and at least two other respective portions of the boot code being transferred into the volatile memory via a system bus or memory bus of the System-on-Chip.

19. The System-on-Chip of claim 14, wherein a size of the respective portion of boot code is different from a size of the other respective portion of boot code.

20. The System-on-Chip of claim 14, wherein the non-volatile memory and the other non-volatile memory are different types of non-volatile memory.

\* \* \* \* \*